US012800513B2

(12) United States Patent
Chen et al.

(10) Patent No.: US 12,800,513 B2
(45) Date of Patent: Nov. 17, 2026

(54) MICRO LED DETECTION DEVICE

(71) Applicant: BUENO OPTICS CO., LTD., Tainan (TW)

(72) Inventors: Kuan-Han Chen, Tainan (TW); Ying-Yun Chen, Tainan (TW)

(73) Assignee: BUENO OPTICS CO., LTD., Tainan (TW)

( * ) Notice: Subject to any disclaimer, the term of this patent is extended or adjusted under 35 U.S.C. 154(b) by 370 days.

(21) Appl. No.: 18/398,651

(22) Filed: Dec. 28, 2023

(65) Prior Publication Data

US 2025/0216338 A1 Jul. 3, 2025

(51) Int. Cl.
*G01N 21/95* (2006.01)

(52) U.S. Cl.
CPC ................................ *G01N 21/9501* (2013.01)

(58) Field of Classification Search
CPC ............................ G01N 21/9501; G03B 27/54
See application file for complete search history.

(56) References Cited

U.S. PATENT DOCUMENTS

| | | | | |
|---|---|---|---|---|
| 6,122,042 | A * | 9/2000 | Wunderman | A61B 1/0607 356/73 |
| 11,784,084 | B2 * | 10/2023 | Xu | H10P 72/0606 269/21 |
| 12,068,182 | B2 * | 8/2024 | Yeh | H10P 72/0618 |
| 2021/0382026 | A1 * | 12/2021 | Narula | G01N 21/01 |
| 2022/0276164 | A1 * | 9/2022 | Aceti | G01S 7/4815 |

* cited by examiner

*Primary Examiner* — Hung V Nguyen
(74) *Attorney, Agent, or Firm* — Che-Yang Chen; Law Office of Michael Chen

(57) ABSTRACT

A micro LED detection device comprises a device table provided with a stepper driving module and a first detection module and a second detection module linked with the stepper driving module, the first detection module has a first microscope lens and laser generators, the second detection module has a second microscope lens; a first air-float platform, a second air-float platform, and a third air-float platform air floated on the device table and respectively connected to first and second linear driving modules and at least one third linear driving module, the third air-float platform has a detection platform; and a detection host having AI judgment units and a processing unit, the AI judgment unit receives a captured picture and generates at least one judgment signal from the captured picture, thereby artificial intelligence is used to perform brightness level discrimination, surface defect and etching depth detection on a micro LED wafer.

8 Claims, 12 Drawing Sheets

MICRO LED DETECTION DEVICE

BACKGROUND OF THE INVENTION

Field of Invention

The invention relates to a detection device, and more particularly to a micro LED detection device capable of using artificial intelligence to perform brightness level discrimination, surface defect detection and etching depth detection to effectively improve detection efficiency and improve precision.

Related Art

Micro LED technology is an LED micro matrix technology, compared with the old LCD and OLED, micro LED has significant advantages in terms of brightness presentation, luminous efficiency, light resolution and response speed. Therefore, the development of micro LED will definitely become a focus in future display technology.

In order to improve and ensure the yield rate of micro LEDs, detection technology will be an important step in the manufacturing process. Currently, there are two general types of detection devices for detecting LEDs, namely 2D detection device and 3D detection device. The general 2D detection device mainly detects the front brightness and surface defects on the front and back of each LED in the LED wafer. However, the detection of the front brightness and surface defects on the front and back of the LED wafer cannot achieve the most complete detection because there is an etching depth in the polar position of the LED, and the etching depth will also affect the yield of LEDs. Therefore, some detection companies will use 3D detection device to detect the etching depth of LEDs.

However, because different detection devices (2D, 3D) have different detection specifications, different alignment methods, and different precisions and positions, so when the same LED wafer is detected by two different detection devices, it is prone to have different detection results due to different device specifications, different device yields, or different device tolerances, resulting in problems such as slow detection efficiency and inaccurate precision.

Therefore, how to improve the drawbacks and tackle the problems mentioned above is the technical difficulty that the inventor of the invention wants to solve.

SUMMARY OF THE INVENTION

Therefore, in order to effectively solve the above problems, a main object of the invention is to provide a micro LED detection device capable of using artificial intelligence to perform brightness level discrimination, surface defect detection and etching depth detection to effectively improve detection efficiency and improve precision.

In order to achieve the above object, the invention provides a micro LED detection device comprising a device table, a bracket and a connecting rod are provided on the device table, on the bracket is provided with a stepper driving module and a first detection module and a second detection module linked with the stepper driving module, the first detection module is provided with a first microscope lens and a plurality of laser generators, and the second detection module is provided with a second microscope lens; a first air-float platform, the first air-float platform is air-floated on a first bearing seat on the device table, the first air-float platform is connected to a first linear driving module, and the first air-float platform is assembled with one end of the connecting rod; a second air-float platform, the second air-float platform is air-floated on a second bearing seat on the device table, the second air-float platform is connected to a second linear driving module, and the second air-float platform is assembled with another end of the connecting rod; a third air-float platform, the third air-float platform is provided on a third bearing seat on the device table, one side of the third bearing seat is connected to the first air-float platform, another side thereof is connected to the second air-float platform, the third air-float platform is connected to at least one third linear driving module, and a detection platform is provided on the third air-float platform; and a detection host, the detection host is connected to the first detection module and the second detection module via signals, and the detection host has a plurality of AI judgment units and a processing unit, the AI judgment unit receives at least one captured picture from the first detection module and the second detection module, and the AI judgment unit generates at least one judgment signal from the captured picture and sends the at least one judgment signal to the processing unit.

According to one embodiment of the invention, wherein the bracket is further provided with a linkage seat, the stepper driving module is connected to the linkage seat, and the first detection module and the second detection module are provided on the linkage seat.

According to one embodiment of the invention, wherein the first detection module is assembled on the linkage seat by a first lifting module, and the second detection module is assembled on the linkage seat by a second lifting module.

According to one embodiment of the invention, wherein the first microscope lens and the second microscope lens are disposed on a same horizontal reference line and on a same horizontal tangent line.

According to one embodiment of the invention, wherein the first bearing seat integrally extends the device table, a first guide part is provided on a side of the first bearing seat, and the first air-float platform is positionally limited by the first guide part and air-floated on the first bearing seat.

According to one embodiment of the invention, wherein the first bearing seat is fixedly disposed on the device table, a first guide part is provided on a side of the first bearing seat, and the first air-float platform is positionally limited by the first guide part and air-floated on the first bearing seat, the second bearing seat is fixedly disposed on the device table, a second guide part is provided on a side of the second bearing seat, and the second air-float platform is positionally limited by the second guide part and air-floated on the second bearing seat.

According to one embodiment of the invention, wherein the first air-float platform and the second air-float platform are respectively connected to the two sides of the third bearing seat by a platform bracket and separated on the device table, a third guide part is provided on a side of the third bearing seat, and the third air-float platform is positionally limited by the third guide part and air-floated on the third bearing seat.

According to one embodiment of the invention, wherein a first shaft hole is formed at one end of the connecting rod, and a second shaft hole is formed at another end thereof, a first guide shaft is provided in the first air-float platform to pass through the first shaft hole, and a second guide shaft is provided in the second air-float platform to pass through the second shaft hole.

According to one embodiment of the invention, wherein one end of the third bearing seat is connected to the first air-float platform, and another end thereof is connected to the second air-float platform.

According to one embodiment of the invention, wherein at least one signal detection unit is further provided on the device table.

DETAILED DESCRIPTION OF THE INVENTION

Figure 1:
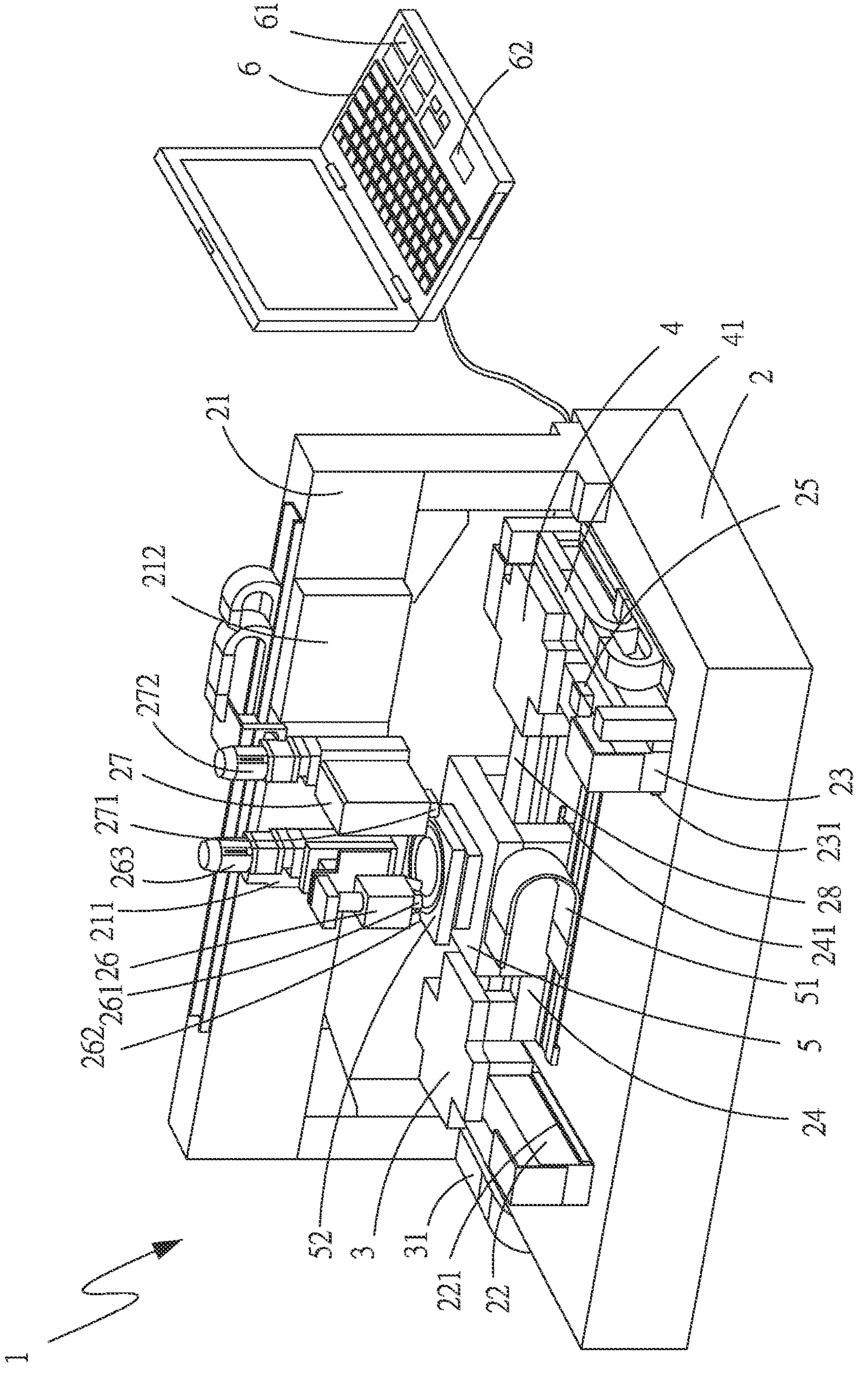
FIG. 1 is a perspective view of a micro LED detection device of the invention.
Figure 2:
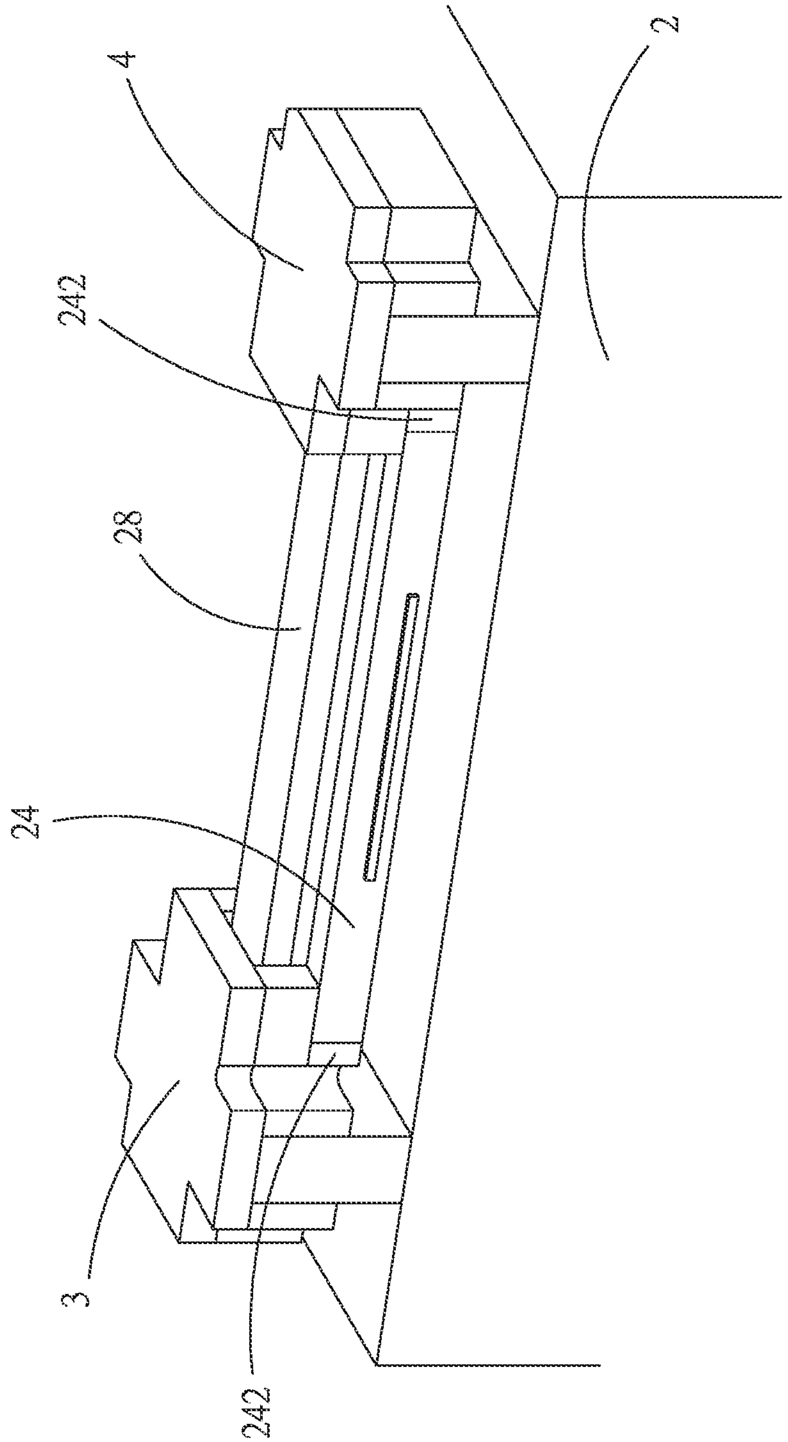
FIG. 2 is a first partial perspective view of the micro LED detection device of the invention.
Figure 3:
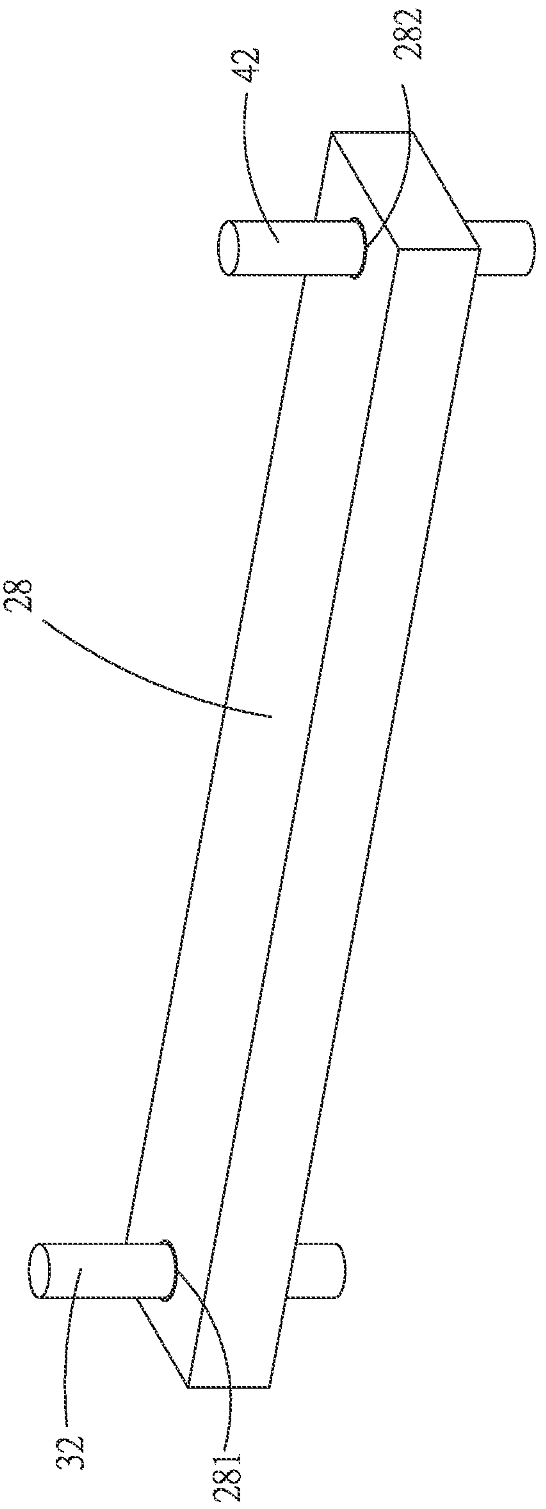
FIG. 3 is a second partial perspective view of the micro LED detection device of the invention.
Figure 4:
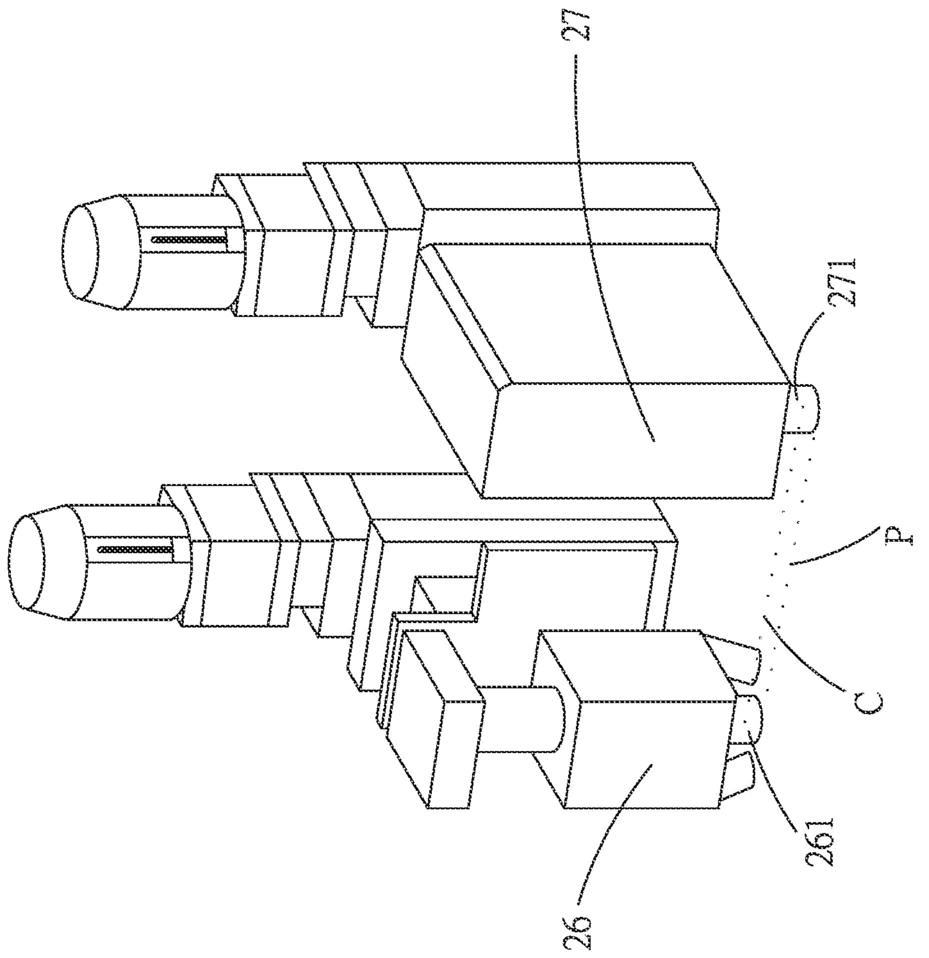
FIG. 4 is a third partial perspective view of the micro LED detection device of the invention.

The above objects of the invention, as well as its structural and functional features, will be described in accordance with the preferred embodiments of the accompanying drawings.

In the following, for the formation and technical content related to a micro LED detection device of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numbers.

Firstly, please refer to FIGS. 1 to 4 respectively for a perspective view, a first partial perspective view, a second partial perspective view and a third partial perspective view of a micro LED detection device of the invention. A micro LED detection device 1 comprises a device table 2, a first air-float platform 3, a second air-float platform 4, a third air-float platform 5 and at least one detection host 6.

Wherein the device table 2 is a platform made of marble or granite, and a bracket 21, a first bearing seat 22, a second bearing seat 23 and a third bearing seat 24 are provided on or above the device table 2. The first bearing seat 22 and the second bearing seat 23 are fixedly assembled on the device table 2, and the third bearing seat 24 is separated from the device table 2. The first bearing seat 22, the second bearing seat 23 and the third bearing seat 24 are seat bodies also made of marble or granite. The first bearing seat 22 is provided with a first guide part 221 on one side, the second bearing seat 23 is provided with a second guide part 231 on one side, and the third bearing seat 24 is provided with a third guide part 241 on one side. In addition, the bracket 21 is further provided with a linkage seat 211 and a stepper driving module 212 connected to each other. The stepper driving module 212 is a stepper motor and connected to the detection host 6 via signals.

Wherein the device table 2 is further provided with a signal detection unit 25, a first detection module 26 and a second detection module 27. The signal detection unit 25 can be disposed on the first air-float platform 3 or the second air-float platform 4 and is connected to the detection host 6 via signals, and the first detection module 26 and the second detection module 27 are disposed on the linkage seat 211, wherein a bottom of the first detection module 26 is provided with a first microscope lens 261 and a plurality of laser generators 262, and a first lifting module 263 is provided behind. Wherein the first detection module 26 and the first microscope lens 261 can be a set of optical detection microscope. The first lifting module 263 can be a stepper motor, the laser generator 262 can be a light-emitting device capable of generating excitation micro LED light. The first detection module 26 is assembled on the linkage seat 211 by the first lifting module 263, and the first detection module 26, the laser generators 262 and the first lifting module 263 are connected to the detection host 6 via signals. A bottom of the second detection module 27 is provided with a second microscope lens 271, and a second lifting module 272 is provided behind. Wherein the second detection module 27 and the second microscope lens 271 can be a set of 3D optical detection module, such as a 3D optical surface profilometer, and the second lifting module 272 can be a stepper motor. Wherein the second microscope lens 271 and the first microscope lens 261 are disposed on a same horizontal reference line P or on a same horizontal tangent line C, or both conditions can be satisfied at the same time. The second detection module 27 is assembled on the linkage seat 211 by the second lifting module 272, and the second detection module 27 and the second lifting module 272 are connected to the detection host 6 via signals.

Wherein the first air-float platform 3 is disposed on the first bearing seat 22 on the device table 2, the first air-float platform 3 is positionally limited by the first guide part 221 and air-floated on the first bearing seat 22, the first air-float platform 3 is connected to a first linear driving module 31, and the first linear driving module 31 is connected to the detection host 6 via signals.

Wherein the second air-float platform 4 is disposed on the second bearing seat 23 on the device table 2, the second air-float platform 4 is positionally limited by the second guide part 231 and air-floated on the second bearing seat 23, the second air-float platform 4 is connected to a second linear driving module 41, and the second linear driving module 41 is connected to the detection host 6 via signals.

Wherein the third air-float platform 5 is disposed on the two third bearing seats 24 (only shows one side due to viewing angle in FIG. 1), and two sides of any one of the third bearing seats 24 are respectively connected to the first air-float platform 3 and the second air-float platform 4 by a platform bracket 242, making the third bearing seat 24 and the device table 2 in a separated state. The third air-float platform 5 is positionally limited by the third guide part 241 and air-floated on the third bearing seat 24 and the connecting rod 28. The third air-float platform 5 is connected to at least one third linear driving module 51, and the third linear driving module 51 is also connected to the third bearing seat 24, and therefore, the third linear driving module 51 is also in a separated state (not combined) with the device table 2. The third linear driving module 51 is connected to the detection host 6 via signals, so one end of the third bearing seat 24 is connected to the first air-float platform 3, and another end thereof is assembled to the second air-float platform 4, making the third air-float platform 5, the third linear driving module 51 and the third bearing seat 24 to suspend above the device table 2. A detection platform 52 is provided on the third air-float platform 5.

Wherein the device table 2 is further provided with a connecting rod 28. The connecting rod 28 passes below the third air-float platform 5 and does not contact the third air-float platform 5. One end of the connecting rod 28 is assembled with the first air-float platform 3, and another end thereof is assembled with the second air-float platform 4. The connecting rod 28 is formed with a first shaft hole 281 at one of the ends and a second shaft hole 282 at the other end. Inside the first air-float platform 3 is provided with a first guide shaft 32 passing through the first shaft hole 281, and inside the second air-float platform 4 is provided with a second guide shaft 42 passing through the second shaft hole 282.

The detection host 6 has a plurality of AI judgment units 61 and a processing unit 62, and the AI judgment units 61 are connected to the processing unit 62 with signals.

Figure 5:
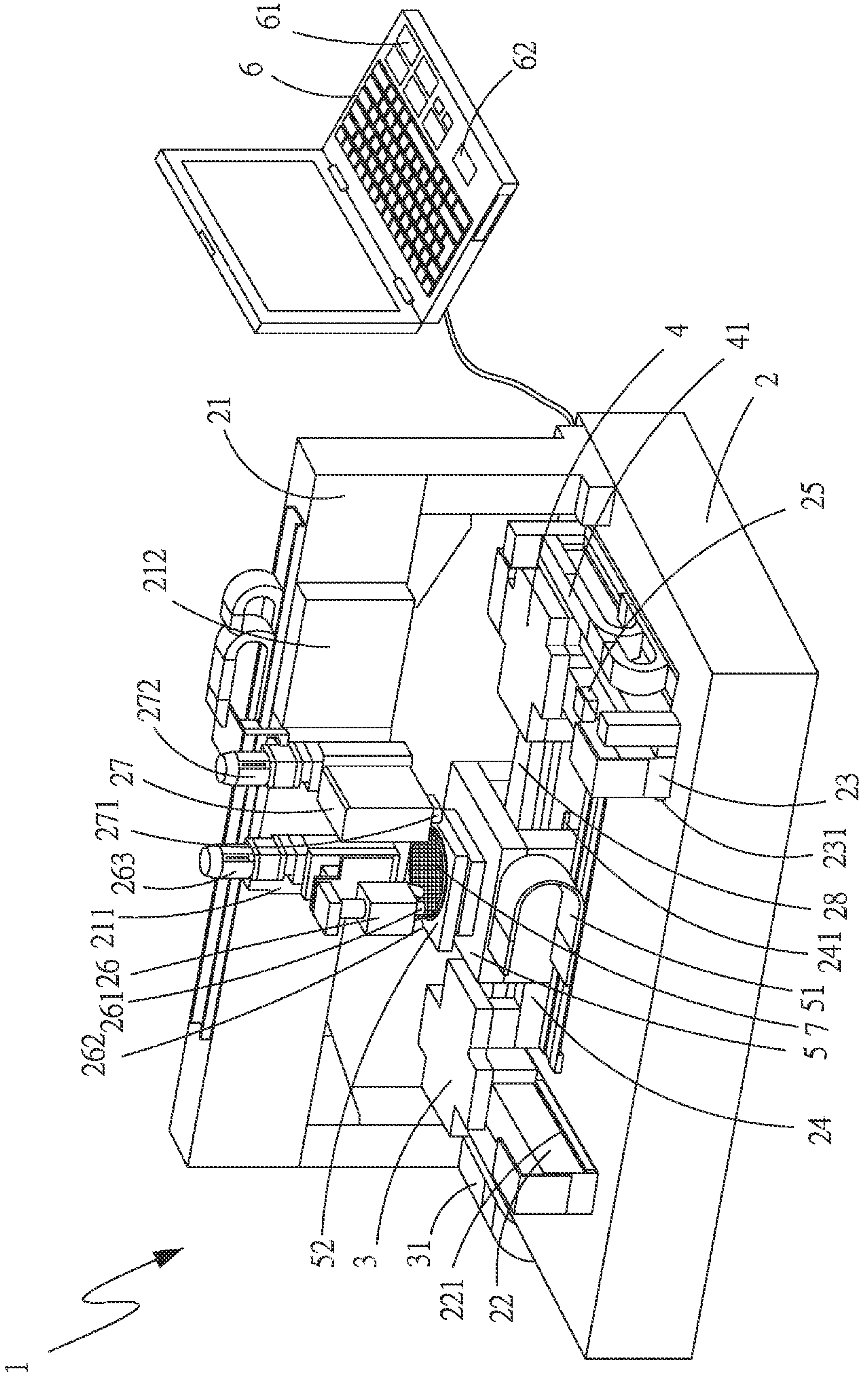
FIG. 5 is a first perspective view of implementation of the micro LED detection device of the invention.
Figure 6:
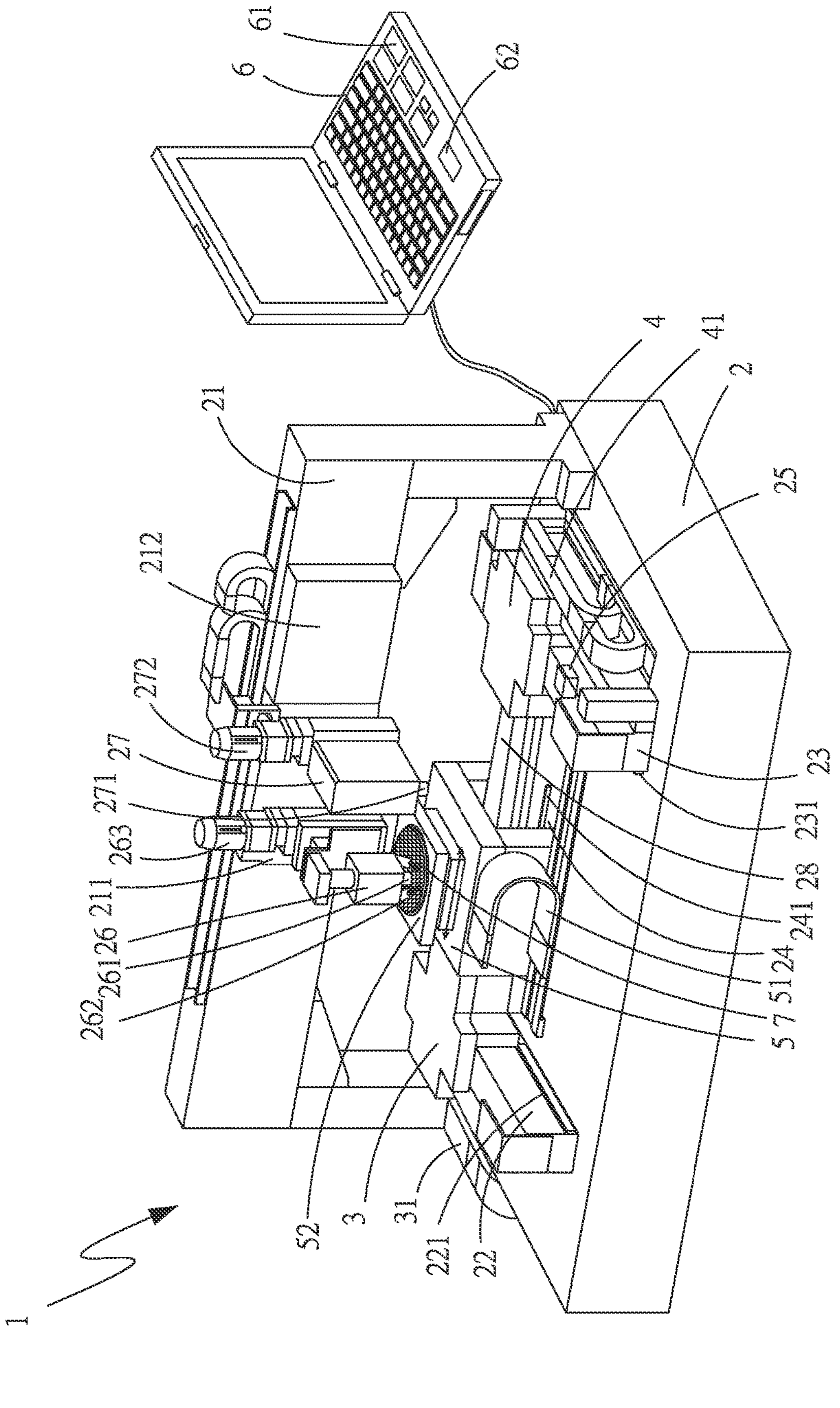
FIG. 6 is a second perspective view of implementation of the micro LED detection device of the invention.

Please refer to the aforementioned accompanying drawings and FIGS. 5 and 6 respectively for a first perspective view of implementation and a second perspective view of implementation of the micro LED detection device of the invention. Wherein when the micro LED detection device 1 detects a micro LED wafer, a to-be-detected micro LED wafer 7 is placed on the detection platform 52. The detection platform 52 is capable of vacuum adsorbing the to-be-detected micro LED wafer 7, and then the first detection module 26 uses the first microscope lens 261 to detect a positioning point on the to-be-detected micro LED wafer 7 for positioning. The first microscope lens 261 captures pictures of the to-be-detected micro LED wafer 7 and transmits the pictures to the detection host 6. The detection host 6 uses the processing unit 62 to determine a position of the first detection module 26 and the positioning point and generate a control signal. Wherein if the first microscope lens 261 and the to-be-detected micro LED wafer 7 need to be displaced left and right for alignment, the control signal of the detection host 6 is transmitted to the third linear driving module 51, and the third linear driving module 51 drives the third air-float platform 5 to displace in an X-axis direction on the device table 2, so that the first microscope lens 261 is positioned with the to-be-detected micro LED wafer 7.

Figure 7:
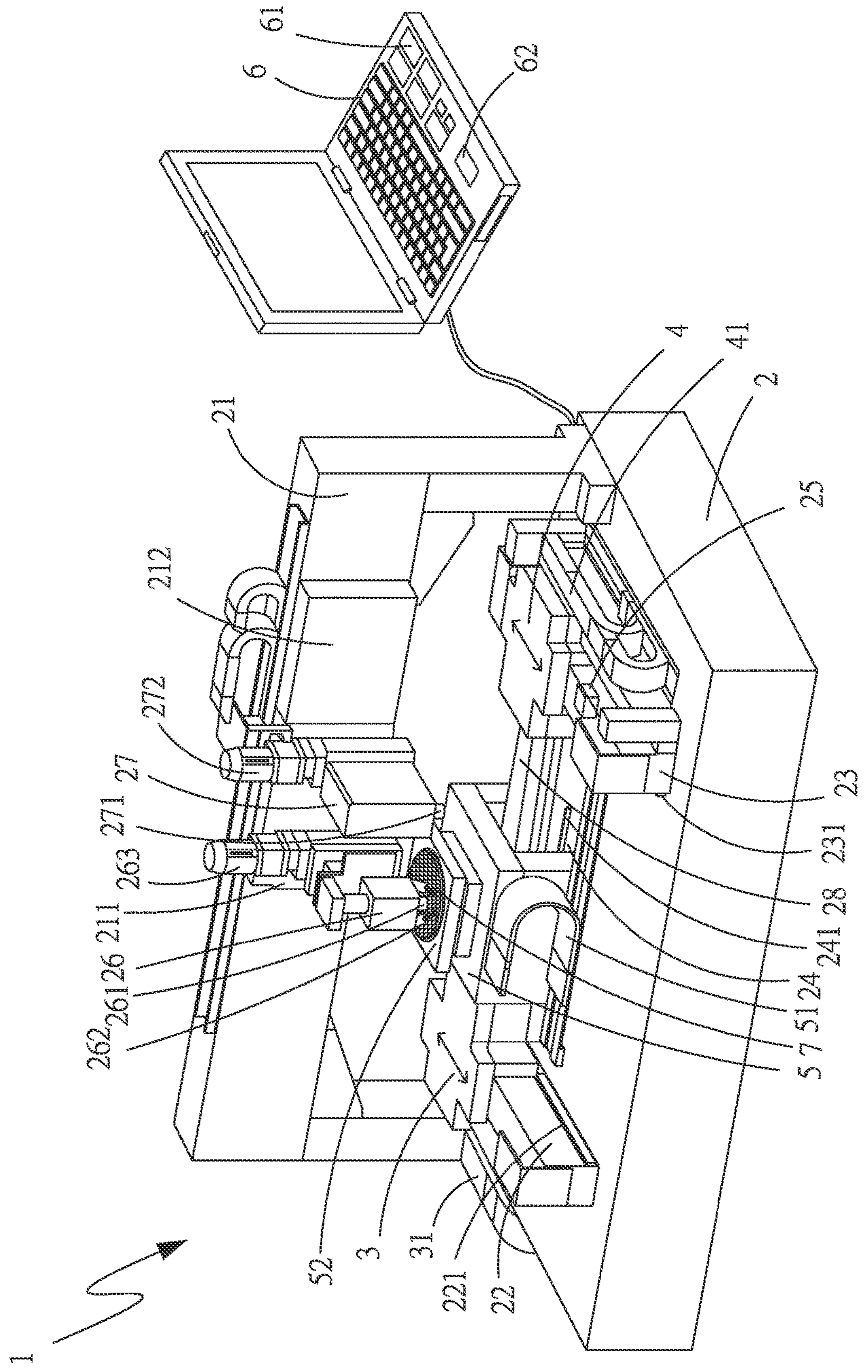
FIG. 7 is a third perspective view of implementation of the micro LED detection device of the invention.
Figure 8:
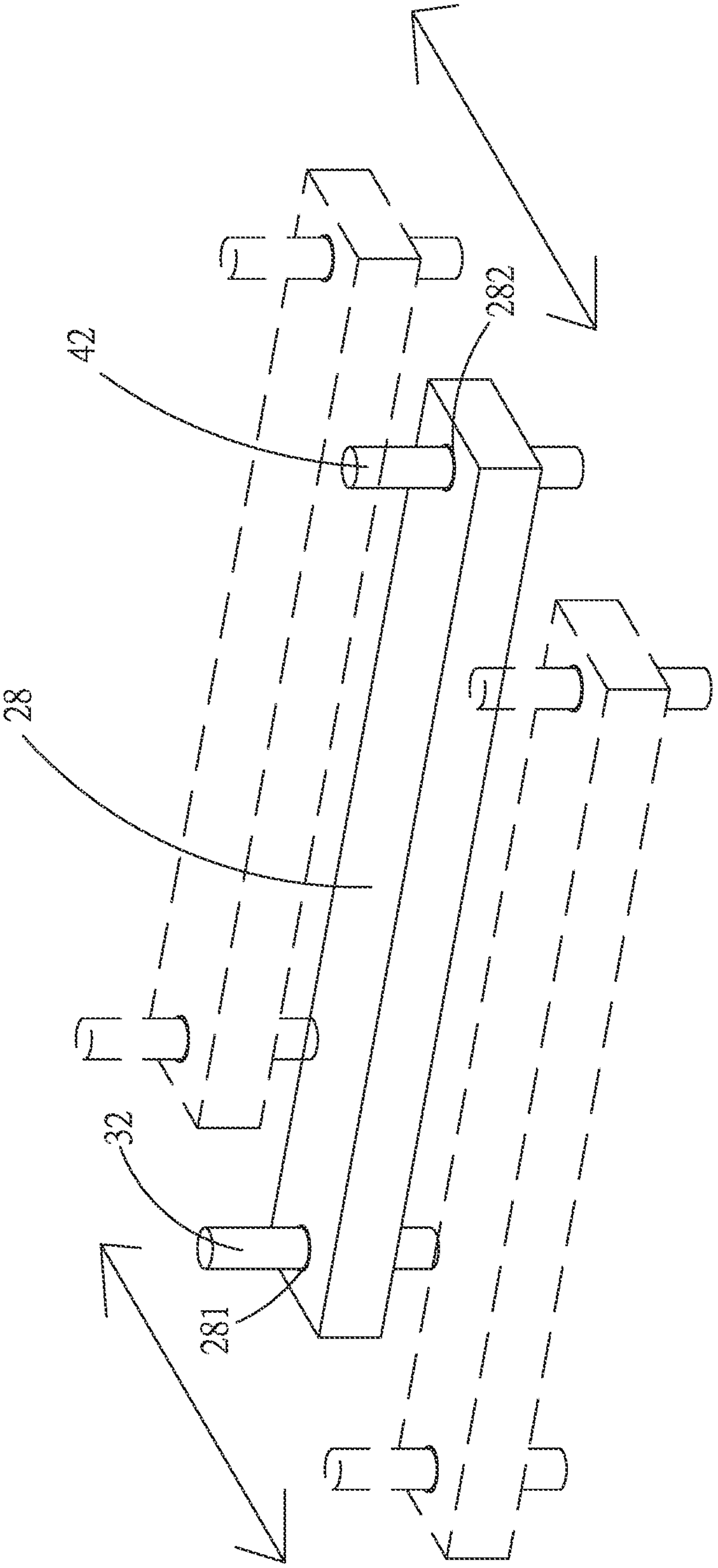
FIG. 8 is a first partial schematic diagram of implementation of the micro LED detection device of the invention.
Figure 9:
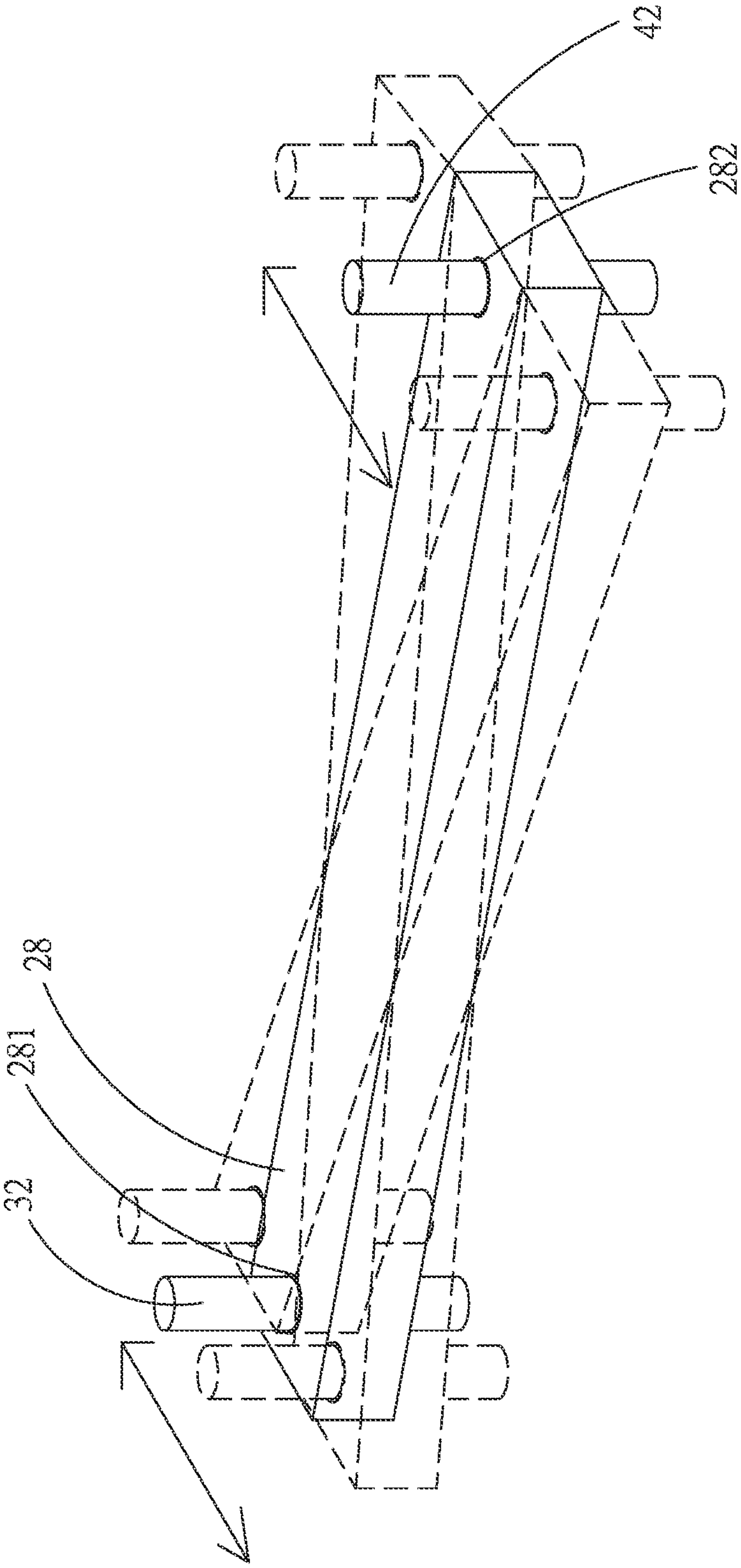
FIG. 9 is a second partial schematic diagram of implementation of the micro LED detection device of the invention.

Please refer to the aforementioned accompanying drawings and FIGS. 7 to 9 respectively for a third perspective view of implementation, a first partial schematic diagram of implementation, and a second partial schematic diagram of implementation of the micro LED detection device of the invention. If the first microscope lens 261 and the to-be-detected micro LED wafer 7 need to be displaced forward and backward for alignment, the control signal of the detection host 6 is transmitted to the first linear driving module 31 and the second linear driving module 41. The first linear driving module 31 drives the first air-float platform 3 to displace on the first bearing seat 22, and the second linear driving module 41 drives the second air-float platform 4 to displace on the second bearing seat 23. When the first air-float platform 3 and the second air-float platform 4 are displaced forward and backward, since the third air-float platform 5, the third linear driving module 51 and the third bearing seat 24 are disposed between the first air-float platform 3 and the second air-float platform 4 and suspended above the device table 2, so the third air-float platform 5 will be driven to displace forward and backward (Y-axis direction) on the device table 2 at the same time, so that the first microscope lens 261 is positioned with the to-be-detected micro LED wafer 7.

Wherein by disposing the first guide shaft 32 of the first air-float platform 3 pivotally in the first shaft hole 281 of the connecting rod 28, and disposing the second guide shaft 42 of the second air-float platform 4 pivotally in the second shaft hole 282 of the connecting rod 28, when the first linear driving module 31 drives the first air-float platform 3 to displace on the first bearing seat 22, the first guide shaft 32 not only drives the connecting rod 28 to displace positionally, the first guide shaft 32 also rotates in the first shaft hole 281; when the second linear driving module 41 drives the second air-float platform 4 to displace on the second bearing seat 23, the second guide shaft 42 not only drives the connecting rod 28 to displace positionally, the second guide shaft 42 also rotates in the second shaft hole 282; so that when the first air-float platform 3 and the second air-float platform 4 displace forward and backward, displacement is carried out at a gentle speed with a buffering effect, and thus the first air-float platform 3 and the second air-float platform 4 will not get stuck due to out of sync in speed or direction.

After positioning is completed, the first detection module 26 starts the laser generators 262, and the laser generators 262 irradiate the to-be-detected micro LED wafer 7 with laser light, causing the to-be-detected micro LED wafer 7 to produce a fluorescent reaction, and then the first microscope lens 261 takes a captured picture of brightness of the to-be-detected micro LED wafer 7 and transmits the captured picture to the first detection module 26. The first detection module 26 transmits the captured picture to the detection host 6, the detection host 6 uses one of the AI judgment units 61 to judge a brightness level of the captured picture, and sends a judgment result to the processing unit 62 to achieve an efficacy of using artificial intelligence to judge a brightness level.

Wherein, after brightness level discrimination of the to-be-detected micro LED wafer 7 is completed, the first detection module 26 turns off the laser generators 262, and then the first microscope lens 261 is used to photograph a captured picture of a front surface of the to-be-detected micro LED wafer 7 and the captured picture is transmitted to the first detection module 26. The first detection module 26 transmits the captured picture to the detection host 6, the detection host 6 uses the other one of the AI judgment units 61 to perform front surface defect judgment on the captured picture, and sends a judgment result to the processing unit 62 to achieve an efficacy of using artificial intelligence to detect front surface defects.

Figure 10:
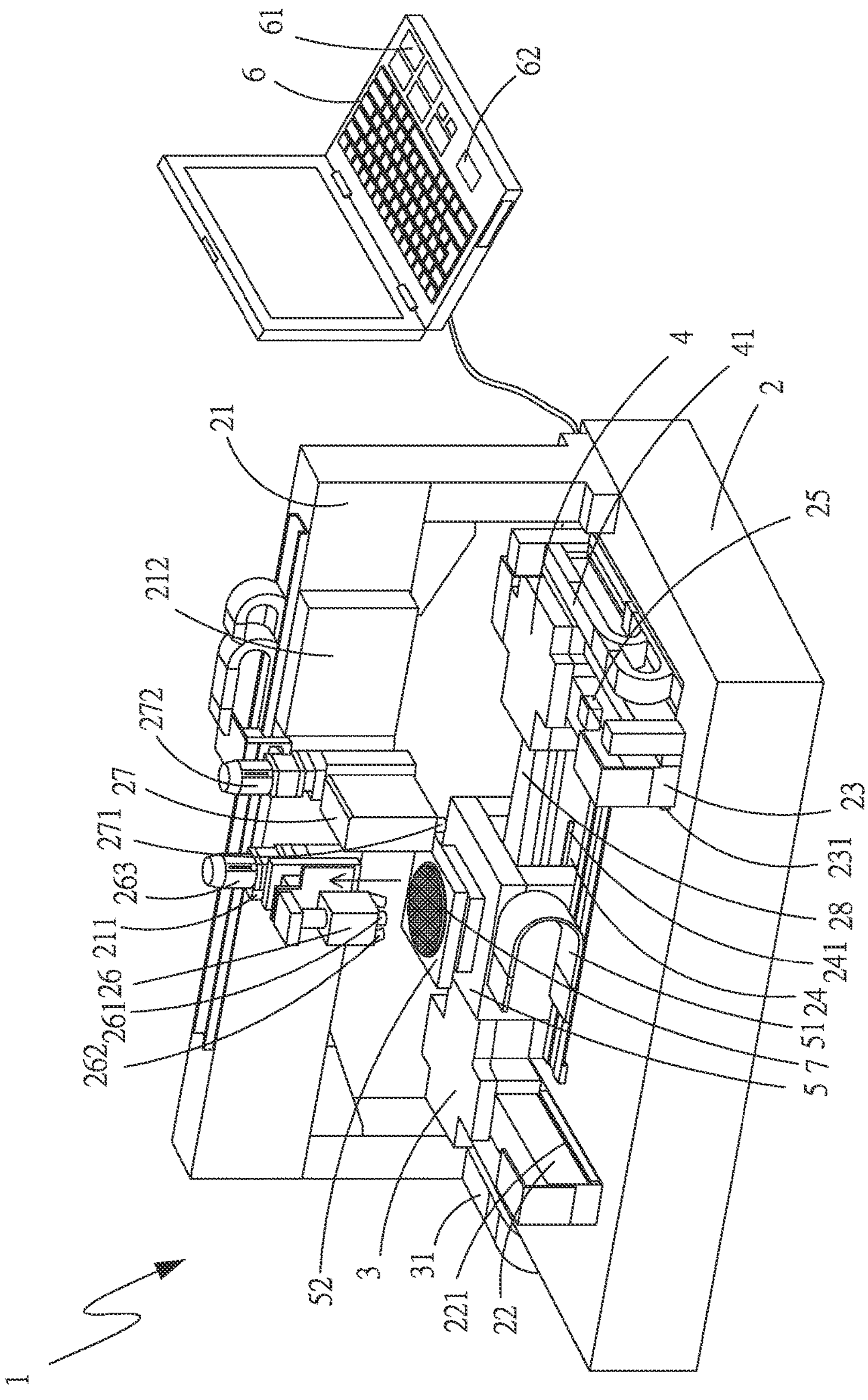
FIG. 10 is a fourth perspective view of implementation of the micro LED detection device of the invention.
Figure 11:
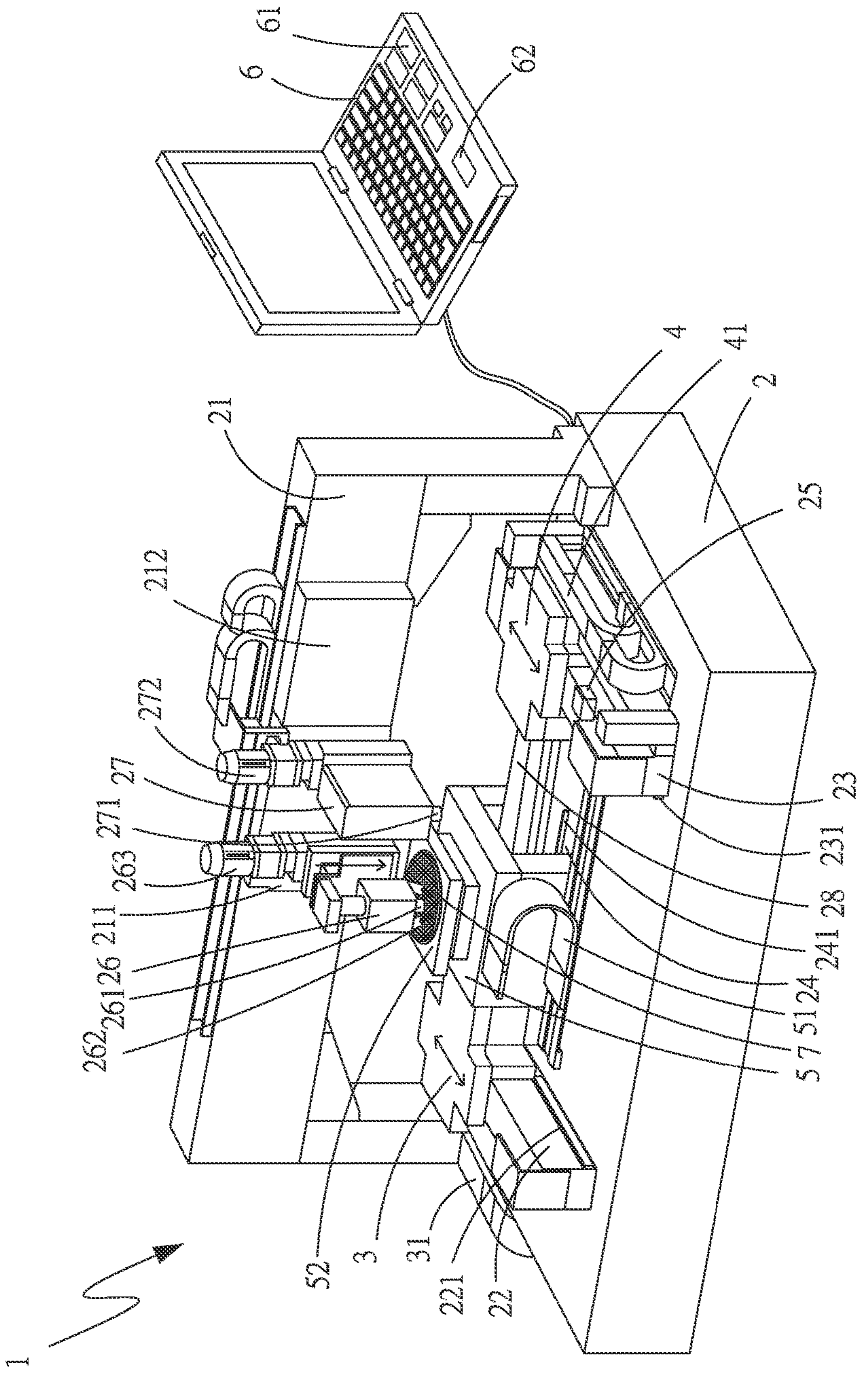
FIG. 11 is a fifth perspective view of implementation of the micro LED detection device of the invention.

Please refer to FIGS. 10 and 11 respectively for a fourth perspective view of implementation and a fifth perspective view of implementation of the micro LED detection device of the invention. After front surface defect discrimination of the to-be-detected micro LED wafer 7 is completed, the first lifting module 263 drives the first detection module 26 to ascend vertically, so that the to-be-detected micro LED wafer 7 can be flipped to back side and reset to the detection platform 52. Then the first lifting module 263 drives the first detection module 26 to descend vertically, the first microscope lens 261 is aligned with the to-be-detected micro LED wafer 7, and then the first microscope lens 261 takes a captured picture of a back surface of the to-be-detected micro LED wafer 7 and the captured picture is transmitted to the first detection module 26. The first detection module 26 transmits the captured picture to the detection host 6, the detection host 6 uses the other one of the AI judgment units 61 to perform back surface defect judgment on the captured picture, and sends a judgment result to the processing unit 62 to achieve an efficacy of using artificial intelligence to detect back surface defects.

Figure 12:
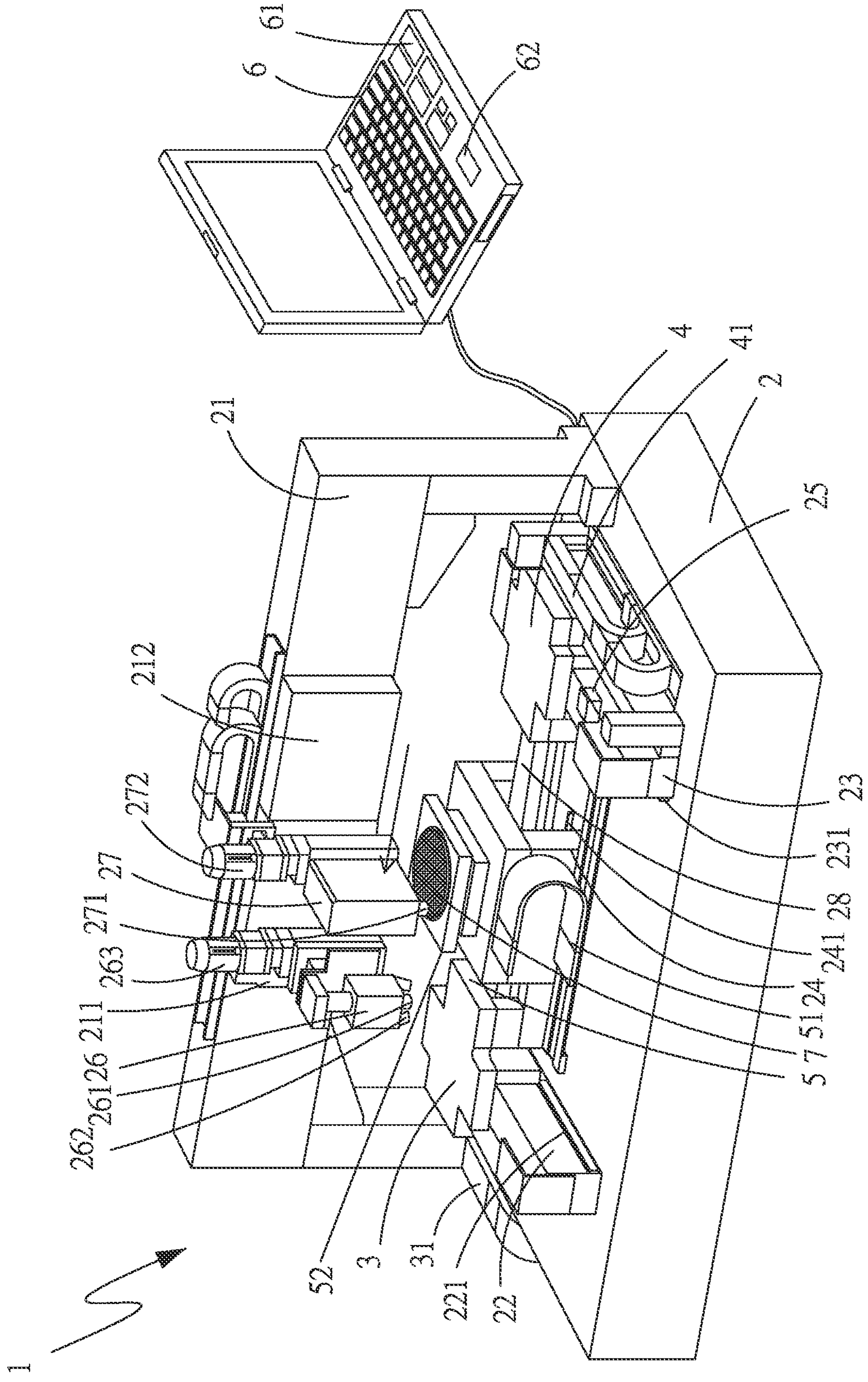
FIG. 12 is a sixth perspective view of implementation of the micro LED detection device of the invention.

Please refer to FIG. 12 for a sixth perspective view of implementation of the micro LED detection device of the invention. After back surface defect discrimination of the to-be-detected micro LED wafer 7 is completed, the stepper driving module 212 drives the linkage seat 211 to move to cause the second detection module 27 to displace to reach above the detection platform 52. Wherein movement of the second detection module 27 is performed by the stepper driving module 212, and the first microscope lens 261 and the second microscope lens 271 are disposed on the same horizontal reference line P and on the same horizontal tangent line C, so the second detection module 27 is capable of directly moving horizontally to reach above the detection platform 52 and directly reaching a position where the first microscope lens 261 has been aligned. Therefore the second microscope lens 271 does not need to be positioned, and a captured picture of a etching depth on the back surface of the to-be-detected micro LED wafer 7 can be photographed by the second microscope lens 271 and transmitted to the second detection module 27. The second detection module 27 transmits the captured picture to the detection host 6, the detection host 6 uses the other one of the AI judgment units 61 to perform etching depth judgment on the captured picture, and sends a judgment result to the processing unit 62 to achieve an efficacy of using artificial intelligence to detect etching depth.

The above-mentioned AI judgment units 61 for judging a brightness level picture, a front surface defect picture, a back surface defect picture and a back surface etching depth picture can be the same AI judgment unit 61 or the different AI judgment units 61. In addition, after a judgment result of the AI judgment unit 61 is sent to the processing unit 62, the processing unit 62 outputs the judgment result. The judgment result can be a judgment result respectively for the brightness level picture, the front surface defect picture, the back surface defect picture, and the back surface etching depth picture, such as: the brightness level is defective, the front surface is flawless, the back surface is defective, or the back surface etching depth is flawless. The judgment result can also be a comprehensive result, for example, if one of the above four types of detection is defective, it means that the micro LED wafer 7 is defective.

Thereby, the micro LED detection device 1 is capable of using artificial intelligence to perform brightness level discrimination, surface defect detection and etching depth detection on the to-be-detected micro LED wafer 7 and marking coordinates for repairing in a next manufacturing process to achieve efficacies of effectively improving detection efficiency and improving precision.

Furthermore, when the first microscope lens 261 takes a captured picture of the to-be-detected micro LED wafer 7, the third linear driving module 51 also drives the third air-float platform 5 to displace on the device table 2 in the aforementioned manner, and the first linear driving module 31 and the second linear driving module 41 also drive the first air-float platform 3 to displace on the first bearing seat 22 and the second air-float platform 4 to displace on the second bearing seat 23 in the aforementioned manner, so that the first microscope lens 261 and the second microscope lens 271 are capable of effectively irradiating micro LEDs at all positions of the to-be-detected micro LED wafer 7.

Wherein the first air-float platform 3, the second air-float platform 4 and the third air-float platform 5 are used to prevent displacement of the detection platform 52 from shaking upward and downward, and the first air-float platform 3 and the second air-float platform 4 are provided with the signal detection unit 25. The signal detection unit 25 monitors a vibration value of the first air-float platform 3 and the second air-float platform 4 and synchronously transmits the vibration value to the detection host 6. If there is any vibration that exceeds a preset vibration value, acceleration and deceleration, or ripple, the detection host 6 is capable of sending out an alarm (the alarm can be a light or a sound, etc.), thereby achieving efficacies of monitoring and avoiding excessive vibration amplitude.

In addition, a quantity of the detection host 6 used by the micro LED detection device 1 can also be more than one, and each of the detection hosts 6 transmits judgment results through the Internet, which can effectively improve an efficiency of the micro LED detection device 1 of judging the to-be-detected micro LED wafer 7.

The invention has been described in detail above, but the above description is only a preferred embodiment of the invention, and should not limit a scope implemented by the invention, that is, all equivalent changes and modifications made according to the applied scope of the invention should still fall within the scope covered by the appended claims of the invention.

What is claimed is:

1. A micro LED detection device comprising:

a device table, a bracket and a connecting rod being provided on the device table, on the bracket being provided with a stepper driving module and a first detection module and a second detection module linked with the stepper driving module, the first detection module being provided with a first microscope lens and a plurality of laser generators, and the second detection module being provided with a second microscope lens;

a first air-float platform, the first air-float platform being air-floated on a first bearing seat on the device table, the first air-float platform being connected to a first linear driving module, and the first air-float platform being assembled with one end of the connecting rod;

a second air-float platform, the second air-float platform being air-floated on a second bearing seat on the device table, the second air-float platform being connected to a second linear driving module, and the second air-float platform being assembled with another end of the connecting rod;

a third air-float platform, the third air-float platform being provided on a third bearing seat on the device table, one side of the third bearing seat being connected to the first air-float platform, another side thereof being connected to the second air-float platform, the third air-float platform being connected to at least one third linear driving module, and a detection platform being provided on the third air-float platform; and a detection host, the detection host being connected to the first detection module and the second detection module via signals, and the detection host having a plurality of AI judgment units and a processing unit, wherein the AI judgment units are configured to analyze inspection images captured by the first detection module and the second detection module and generate corresponding judgment signals for determining at least one of the brightness level, surface defects, and etching depth of a micro LED wafer, and the processing unit outputs a judgment result.

2. The micro LED detection device as claimed in claim 1, wherein the bracket is further provided with a linkage seat, the stepper driving module is connected to the linkage seat, and the first detection module and the second detection module are provided on the linkage seat.

3. The micro LED detection device as claimed in claim 2, wherein the first detection module is assembled on the linkage seat by a first lifting module, and the second detection module is assembled on the linkage seat by a second lifting module.

4. The micro LED detection device as claimed in claim 1, wherein the first microscope lens and the second microscope lens are disposed on a same horizontal reference line and on a same horizontal tangent line.

5. The micro LED detection device as claimed in claim 1, wherein the first bearing seat is fixedly disposed on the device table, a first guide part is provided on a side of the first bearing seat, and the first air-float platform is positionally limited by the first guide part and air-floated on the first bearing seat, the second bearing seat is fixedly disposed on the device table, a second guide part is provided on a side of the second bearing seat, and the second air-float platform is positionally limited by the second guide part and air-floated on the second bearing seat.

6. The micro LED detection device as claimed in claim 5, wherein the first air-float platform and the second air-float platform are respectively connected to the two sides of the third bearing seat by a platform bracket and separated on the device table, a third guide part is provided on a side of the third bearing seat, and the third air-float platform is positionally limited by the third guide part and air-floated on the third bearing seat.

7. The micro LED detection device as claimed in claim 1, wherein a first shaft hole is formed at one end of the connecting rod, and a second shaft hole is formed at another end thereof, a first guide shaft is provided in the first air-float platform to pass through the first shaft hole, and a second guide shaft is provided in the second air-float platform to pass through the second shaft hole.

8. The micro LED detection device as claimed in claim 1, wherein at least one signal detection unit is further provided on the device table.

* * * * *